June 19, 1951   H. L. BERKEY   2,557,069
MACHINE TOOL FOR TAPER THREADINGS
Filed June 4, 1945   9 Sheets-Sheet 1

Inventor
HARRY L. BERKEY
By
Strauch & Hoffman
Attorneys

June 19, 1951 H. L. BERKEY 2,557,069
MACHINE TOOL FOR TAPER THREADINGS
Filed June 4, 1945 9 Sheets-Sheet 2

Inventor
HARRY L. BERKEY
By Strauch & Hoffman
Attorneys

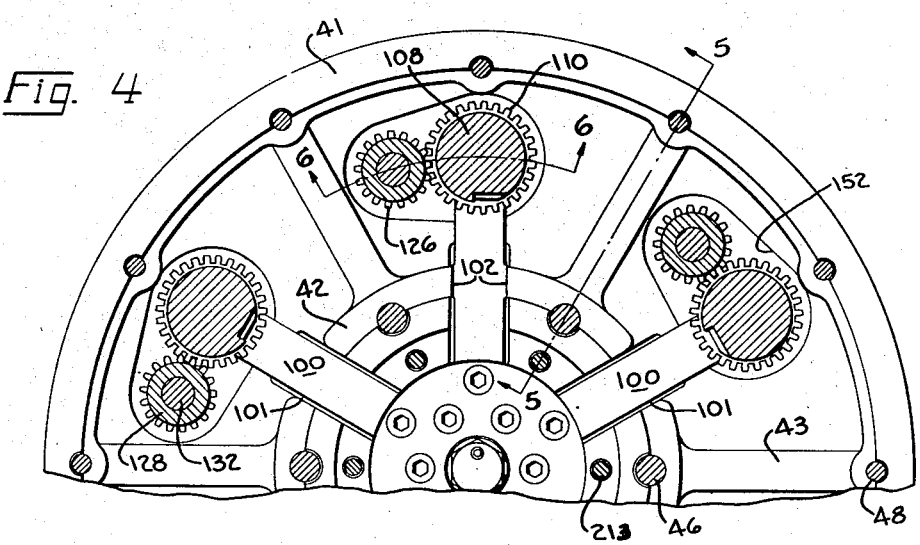

June 19, 1951

H. L. BERKEY 2,557,069

MACHINE TOOL FOR TAPER THREADINGS

Filed June 4, 1945

Inventor

HARRY L. BERKEY

By Strauch & Hoffman
Attorneys

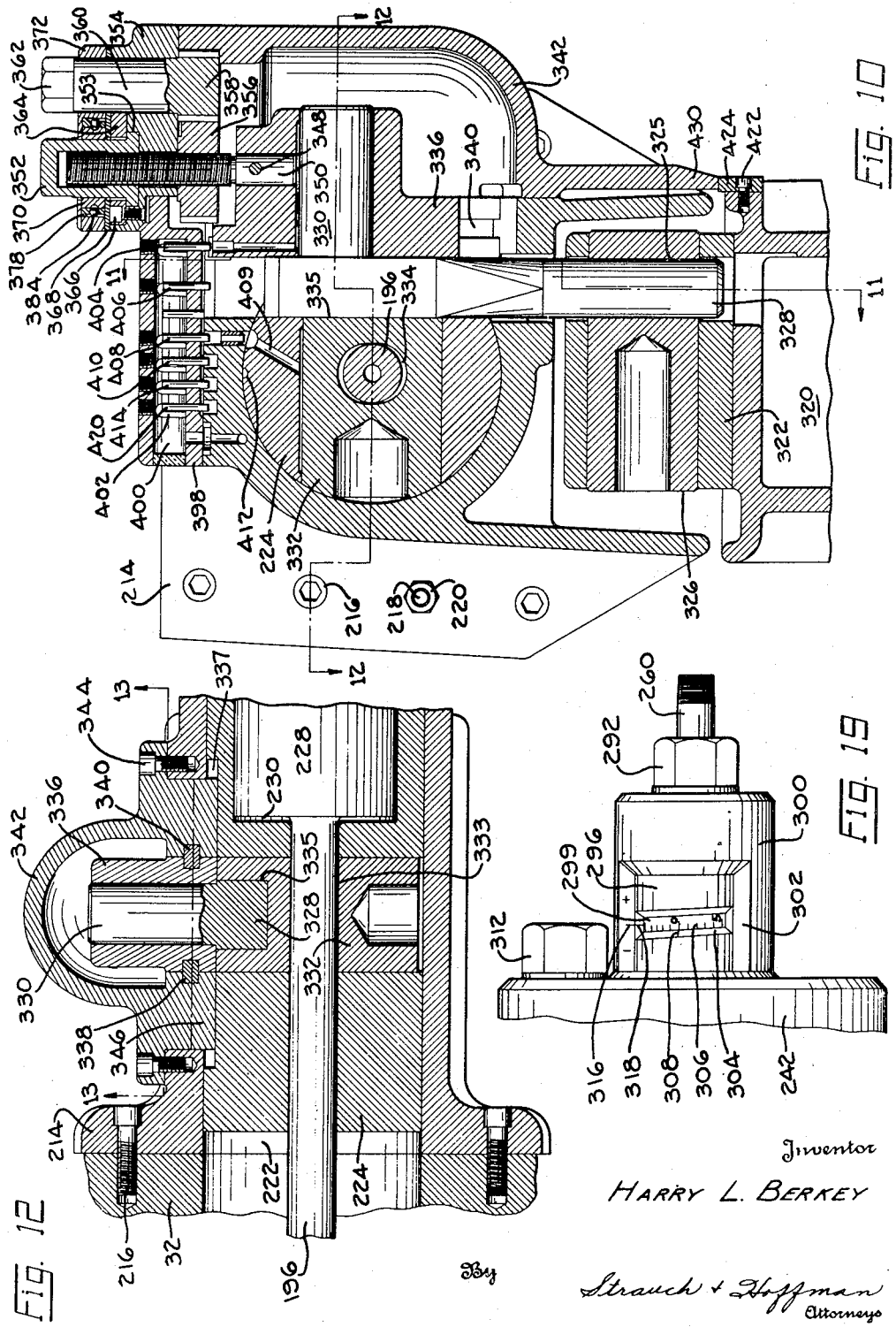

June 19, 1951  H. L. BERKEY  2,557,069
MACHINE TOOL FOR TAPER THREADINGS
Filed June 4, 1945  9 Sheets-Sheet 6
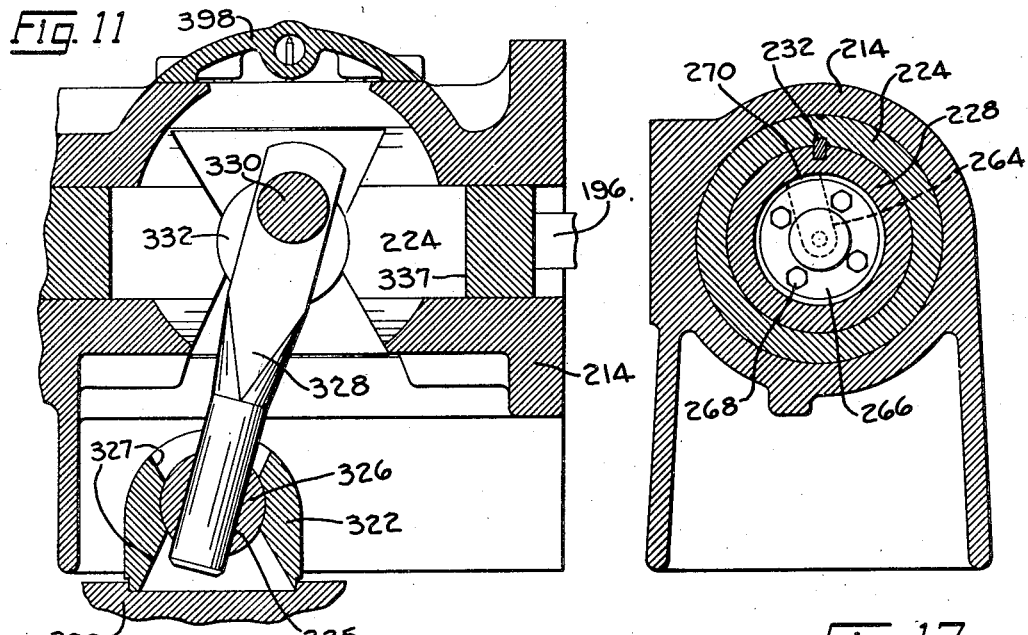
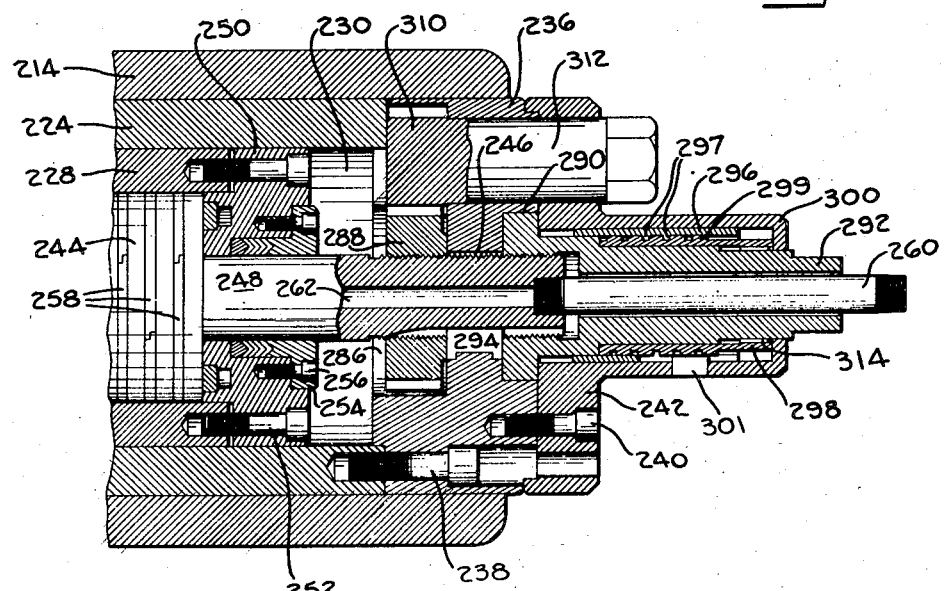
Inventor
HARRY L. BERKEY
By Strauch & Hoffman
Attorneys

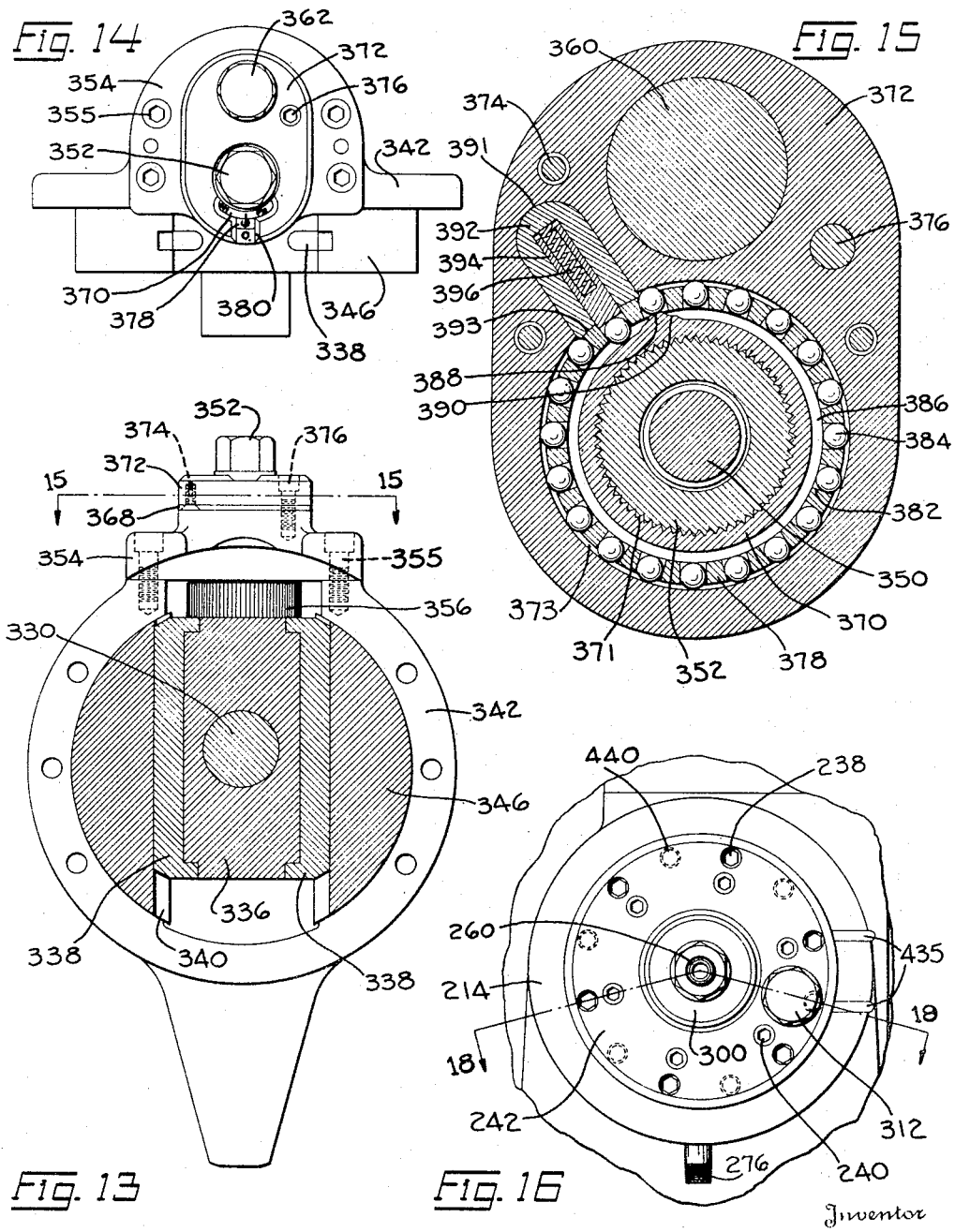

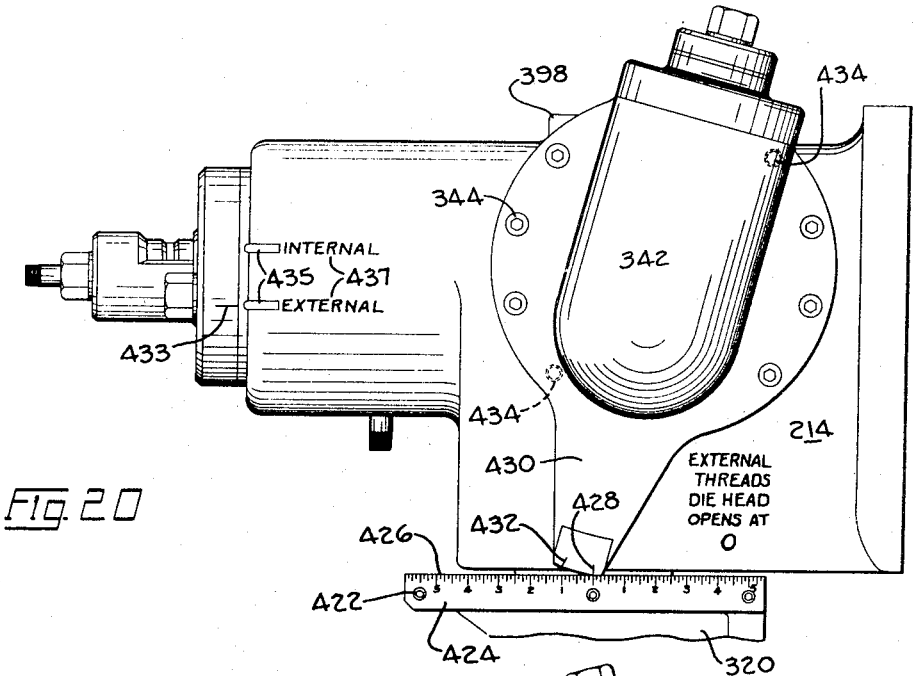
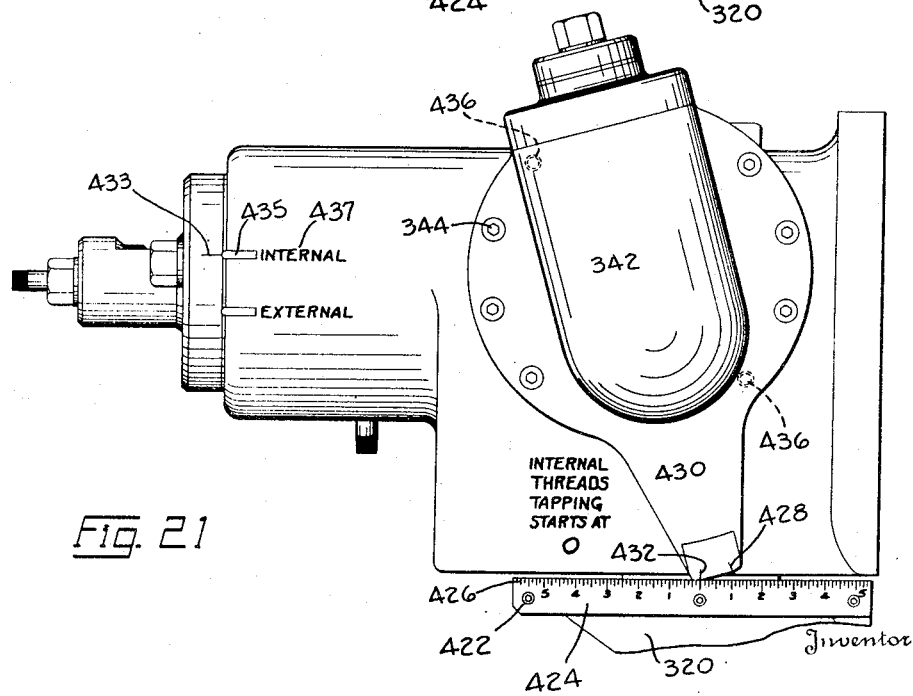

June 19, 1951 H. L. BERKEY 2,557,069
MACHINE TOOL FOR TAPER THREADINGS
Filed June 4, 1945 9 Sheets-Sheet 9
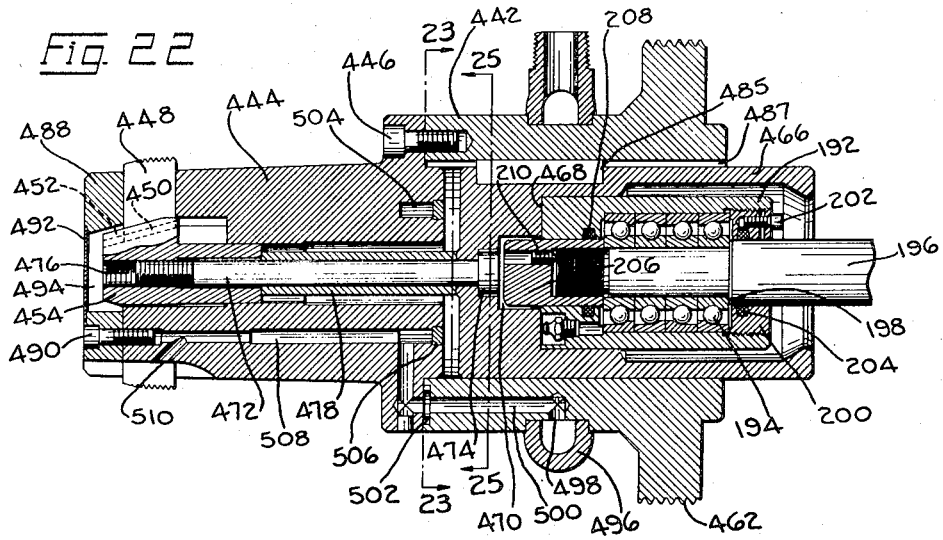
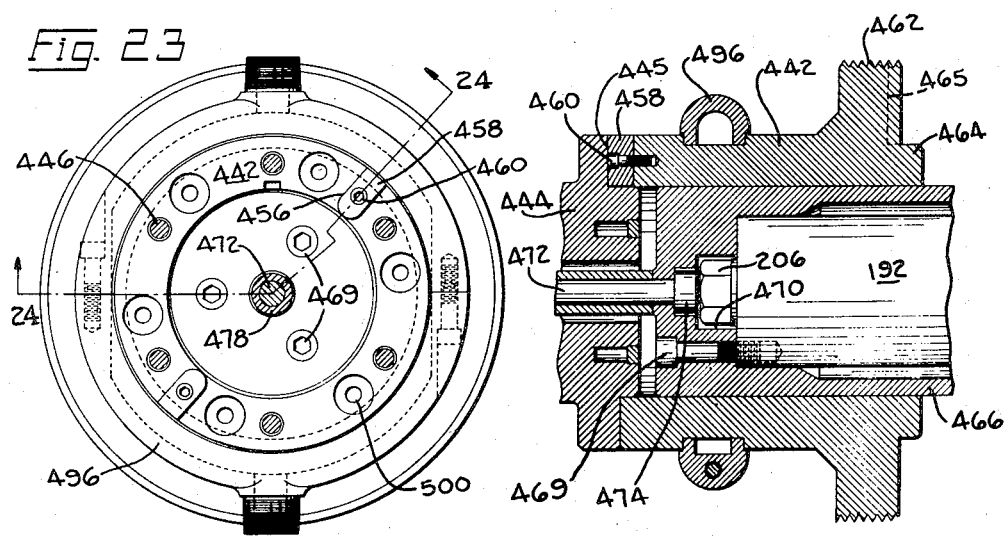
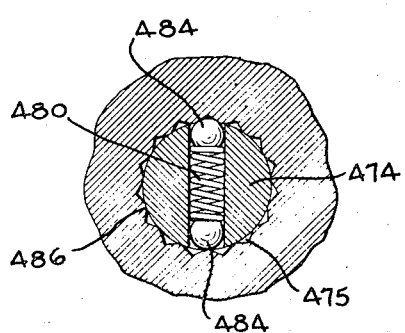
Inventor
HARRY L. BERKEY
By
Strauch & Hoffman
Attorneys Patented June 19, 1951

2,557,069

UNITED STATES PATENT OFFICE 2,557,069

MACHINE TOOL FOR TAPER THREADING

Harry L. Berkey, Waynesboro, Pa., assignor to Landis Machine Company, Waynesboro, Pa., a corporation of Pennsylvania Application June 4, 1945, Serial No. 597,424

39 Claims. (Cl. 10—120.5)

This invention relates to machine tools and more particularly to that general class of cutting tools in which one or more cutting elements are manipulated and controlled to provide a workpiece with a section of predetermined length having an internal or external, tapered or non-tapered machined surface, and upon which screw threads may optionally be formed.

Generically considered, it is a prominent object of the present invention to provide a cutting mechanism embodying cutting elements radially movable relative to the work, together with novel power actuated means for moving said elements into and out of operative relation to the work.

Another important object is to provide means completely enclosed within the cutter head and axially movable relative thereto for simultaneously or independently adjusting the several cutting elements and in which said independent adjustment is effected by means operable from the front of the cutter head.

Another object is to provide a machine tool of this class in which the cutting elements are mounted in a rotatable and axially movable cutter head and wherein said power actuated means is mounted for unitary axial movement with the cutter head.

A further object resides in the provision of interchangeable cutter heads for external or internal operation on a tubular work piece, each having means for operatively connecting the cutting elements with an axially movable member to radially position said elements relative to the work.

It is also an important object of the invention to provide adjustable thread taper controlling means operatively associated with the means for diametrically positioning the cutting elements in the cutter head and also axially movable as a unit with the latter.

One of the detail objects of the invention is to provide a novel construction of the chaser slide adjusting members axially movable in the cutter head and each having means coacting with a cam element swivelled in the respective slides, together with means for locking said members and slides in adjusted position.

The present invention further provides a novel combination of the thread taper producing mechanism with the means for moving the cutting elements into and out of operative position whereby the latter means is bodily moved axially of the cutter head in predetermined ratio to the length of the thread being cut during the progressive thread cutting operation to form an accurately tapered external or internal thread.

A further object of the invention is to provide adjustable mechanism for setting the thread cutting chasers at a predetermined cutting diameter together with taper producing mechanism, and novel means for independently adjusting the latter mechanism whereby work-pieces of different diameters may be provided with any one of a wide range of external or internal thread tapers, without changing the diametrical setting of the chasers.

As a further contribution to the art my invention provides means for adjusting a taper controlling lever in the form of an independent unit, with means for angularly adjusting the position of said unit relative to the chaser adjusting unit for the proper operation of the taper control lever in the cutting of external or internal threads.

The invention additionally contemplates the provision of simple and reliable means for adequately lubricating relatively moving parts of the mechanism as well as an effective coolant distributing system for the several cutting elements.

In general, it is the aim and purpose of the present invention to provide a machine tool characterized by one or more of the above noted novel features, which is distinguished by simplicity of design and a space conserving assembly of its several component units; positive and efficient functional operation with consistently accurate performance and maximum output of finished products; structural durability and facility of assembly of the cooperating elements of the several mechanisms and comparatively low initial cost with minimum maintenance expense.

In the drawings, in which I have illustrated a concrete example of my new machine tool, whereby the above and other subordinate objects and advantages may be practically attained, and wherein similar reference characters designate corresponding parts through the several views:

Figure 3 is a longitudinal sectional view taken substantially on the line 3—3 of Figure 2;

Figure 4 is a fragmentary transverse section of the cutter head taken substantially on the line 4—4 of Figure 3;

Figure 5 is a diametrical sectional view taken substantially on the line 5—5 of Figure 4;

Figure 7 is a detail transverse sectional view taken substantially on the line 7—7 of Figure 3;

Figure 10 is a transverse sectional view taken substantially on the line 10—10 of Figure 9;

Figure 11 is a fragmentary vertical section taken substantially on the line 11—11 of Figure 10;

Figure 12 is a horizontal sectional view taken substantially on the line 12—12 of Figure 10;

Figure 13 is a vertical sectional view of the taper adjusting mechanism taken substantially on the line 13—13 of Figure 12;

Figure 14 is a top plan view of the taper adjusting mechanism;

Figure 15 is a horizontal sectional view on an enlarged scale, taken substantially on the line 15—15 of Figure 13;

Figure 16 is a rear end elevation of the fluid pressure actuated unit;

Figure 17 is a detail transverse section taken substantially on the line 17—17 of Figure 9;

Figure 18 is a longitudinal sectional view taken substantially on the line 18—18 of Figure 16;

Figure 19 is a detail plan view of the means for diametrically adjusting the working position of the cutting elements;

Figure 20 is a side elevation showing the adjusting means of the taper producing mechanism positioned for the cutting of external threads;

Figure 21 is a similar view, showing the taper adjusting mechanism in position for cutting internal threads;

Figure 22 is a longitudinal sectional view of an interchangeable cutter head for cutting internal taper threads with a means for radially positioning the cutting elements thereof operatively connected with the fluid pressure actuated unit and taper producing mechanism;

Figure 23 is a transverse sectional view taken substantially on the line 23—23 of Figure 22;

Figure 24 is a fragmentary longitudinal sectional view taken substantially on the line 24—24 of Figure 23, and Figure 25 is a detail transverse sectional view on an enlarged scale taken substantially on the line 25—25 of Figure 22.

General assembly

Figure 1:
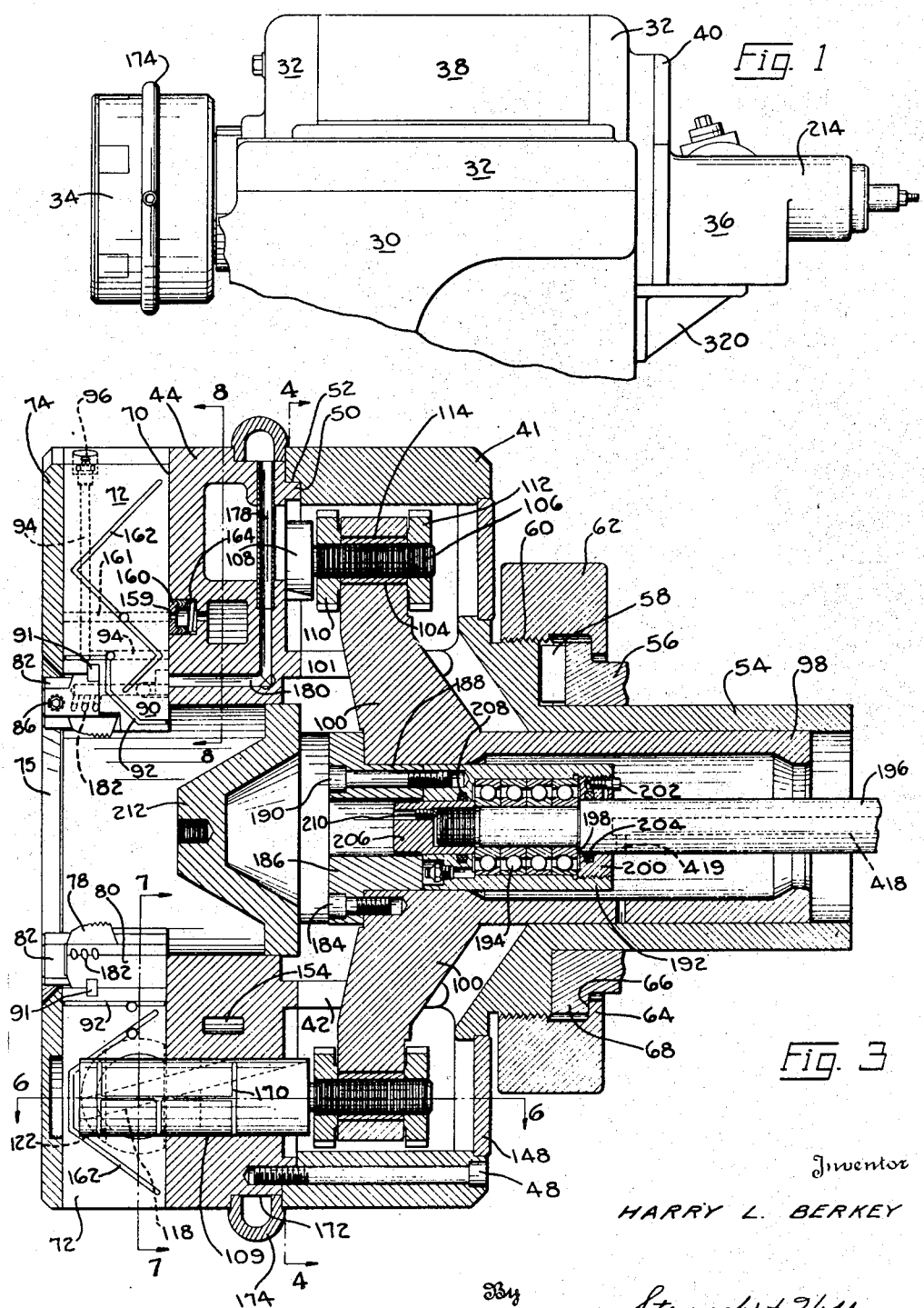
Figure 1 is a side elevation illustrating a preferred general assembly of the several component units of the machine.

In Figure 1 of the drawings, for the purpose of illustration, I have shown a portion of a machine base or bed 30 upon which the carriage 32 is mounted for horizontal reciprocating motion. A spindle is suitably journalled on this carriage and, to the forward end thereof, the cutter head generally indicated at 34 is rigidly attached. Mechanism for diametrically positioning the cutting elements carried by the head 34 and for producing a cut of predetermined taper on the work is combined in a single unit 36 which is mounted on the rear end of the carriage 32 for movement as a unit therewith. The assembly is completed by the housing members 38 and 40 which enclose the mechanism on the carriage 32. It will be understood from the above that the entire assembly is moved forwardly on the machine base while the cutter head 34 is simultaneously rotated relative to the stationary workpiece. When the machine is used for thread cutting, the rate of forward movement of the assembly is proportional to the pitch of the thread to be cut on the work. It will be understood that any approved means, well known in the art, may be provided for reciprocating the carriage 32 and driving the spindle of the cutter head 34.

Cutter head construction

In Figures 2 to 8 of the drawings I have illustrated one embodiment of the rotary cutter head carrying radially movable cutting elements or chasers for the purpose of cutting a tapered external thread on the work. With reference thereto, it will be seen that the cutter head employed for this particular operation comprises two sections of substantially equal external diameter. The rear head section includes concentrically spaced outer and inner annular portions 41 and 42, respectively, which are connected by equidistantly spaced radial webs 43. The front head section 44 is rigidly connected in assembled relation with the rear head section by means of the screws indicated at 46 and 48 in Figure 5 of the drawings. Concentricity of the head sections is obtained by means of the annular piloting flange 50 on the rear face of the head section 44 fitted within the annular groove or recess 52 on the front edge face of the part 41 of the rear head section.

The part 42 of the rear section of the cutter head has a rearwardly extending tubular shank 54 integrally formed therewith which is received in the tubular end portion of the driving spindle 56 for the cutter head and is constrained to rotate therewith by means of the key 58 engaged in a keyway formed in the face of an enlarged diameter section of the shank 54. This section of the shank is externally threaded as at 60, for engagement by the internal threads of a nut 62. The nut is formed with an internally projecting flange 64 at the rear end thereof to engage the rear side face 66 of an external flange 68 on the end of the driving spindle 56. In this manner, the cutter head may be detachably yet rigidly secured to the forward end of the driving spindle.

The cutter head section 44 is provided with a plurality of slideways 70, each of which contains a chaser slide 72. These slides are removably retained in assembled relation with the cutter head by means of the cover plate 74, having a central work receiving opening 75, which is detachably secured to the front face of the head section 44 by the screws 76.

The thread cutting chasers 78 are adjustably mounted in chaser holders 80 by means of the clamp members 82 and screws 84. An adjusting screw 86 is provided to retain the chaser in correct tangential position. Since the construction of this chaser and holder assembly is fully disclosed in the reissue patent to Reimschissel No. 20,930, November 29, 1938, further detail description thereof is not required.

Upon reference to Figure 7 of the drawings, it will be noted that the chaser holder 80 is secured in rigidly assembled relation on the inner end of the slide 72 by means of a screw 88. The inner end of the slide is formed with an extension 90 which provides a recess receiving a part of the holder 80 having an inclined threaded bore 81 opening on one side face thereof and into which the threaded end of the screw 88 is engaged, to draw the holder firmly against the walls of the recess formed by the slide extension 90. This extension serves to absorb the tangentially directed stresses resulting from the cutting operation. The screw 88 extends obliquely through the entire length of the chaser slide 72 between its opposite side faces and is operable from the outer end of the slide. A key 91 prevents relative movement between the slide 72 and the holder 80 axially of the cutter head.

Figure 2:
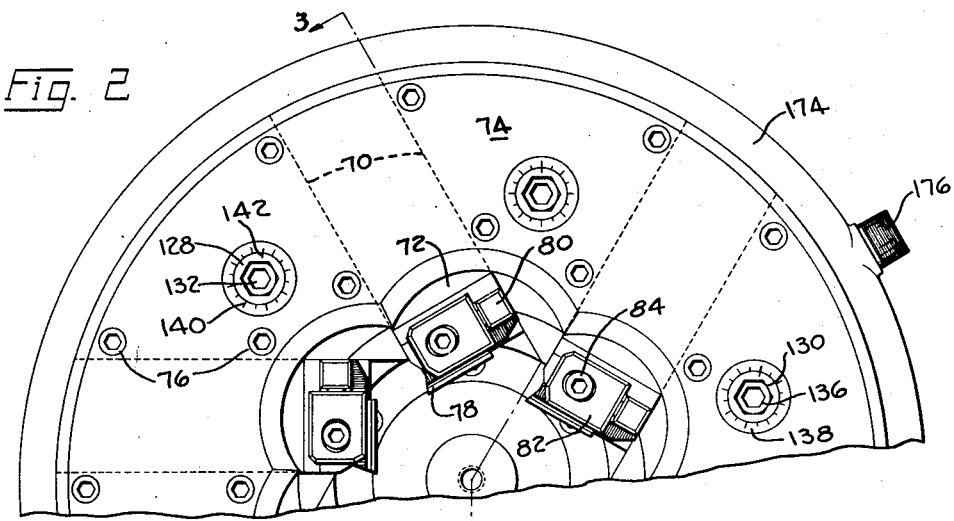
Figure 2 is a fragmentary front side elevation on an enlarged scale of the cutter head.

The slideways 70 are so located and arranged that the cutting edges of the chasers 78 move radially of the cutter head when the slides 72 are adjusted therein as clearly seen in Figure 2.

Near the inner end of the slide 72, a groove 92 extends continuously around the four sides thereof. This groove is supplied with a heavy lubricant through the passages 94 in the slide 72 from the fitting 96 on the outer end of the slide. Thus a seal is formed around the slide which effectively excludes the entrance of foreign matter to the slideway 70.

*Chaser adjusting mechanism*

Within the rear section of the cutter head a spider is mounted for unitary rotation therewith. The radially disposed arms 100 of this spider, equal in number to the chaser slides 72, are integrally formed on the forward end of a tubular member 98 supported in the tubular shank 54 of the cutter head for axial movement relative thereto.

The spider arms 100 are located between the webs 43 and are axially movable relative to said webs in the slots 101 provided in the inner annular portion 42 of the rear cutter head section. One of the spider arms has a relatively thick intermediate portion to provide bearing surfaces on opposite sides thereof, as shown at 102 in Figure 4, for sliding contact with the opposite side walls of the slot 101. Thus, the spider is positively constrained against rotation relative to the cutter head. Adjacent its outer extremity, each spider arm is provided with a cylindrical opening 104 through which the rearwardly projecting threaded stem 106 of a chaser slide adjusting member 108 extends. Upon the threaded stem 106 at opposite sides of the spider arm 100 the internally threaded pinions 110 and 112 are engaged to act as lock nuts and retain the stem 106 in definite axial relationship to the spider arm 100. The clamping pressure of these locking pinions is absorbed by the spacing sleeve 114 in the opening 104 with which hub portions on said pinions have clamping contact.

Figure 6:
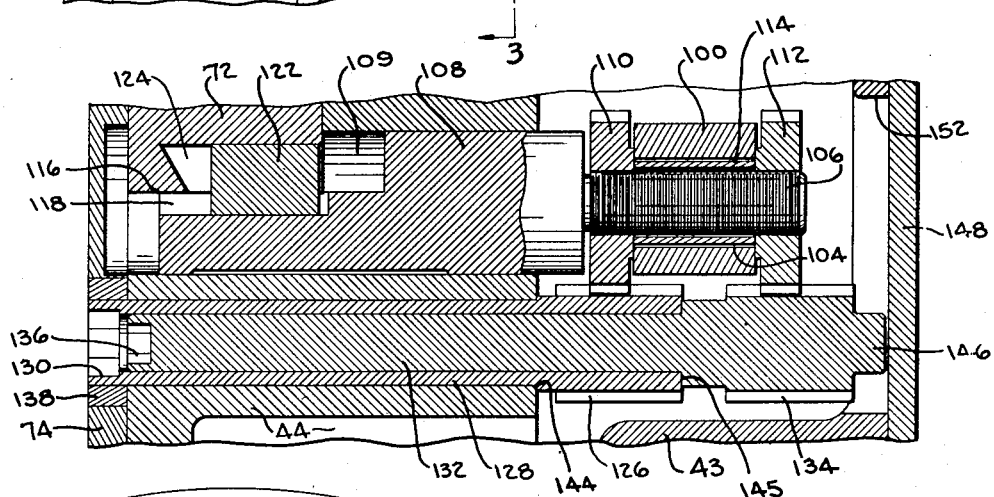
Figure 6 is a longitudinal sectional view taken substantially on the lines 6—6 of Figures 3 and 4.

With particular reference to Figures 3, 6 and 7 of the drawings, it will be noted that each of the adjusting members 108 has a rear cylindrical portion axially movable in an opening 109 formed in the front section 44 of the cutter head at one side of the respective slideways 70. The forward end portion of the member 108 is cut away to provide a longitudinally extending flat side face 116 for sliding engagement with the opposed side face of the slide 72. This flat face of the member 108 is provided with a longitudinally extending keyway 118 obliquely inclined relative to the axis of said member. A cam element 122 in the form of an elongated block is provided on one side face thereof with an obliquely inclined key 120 (Figure 7) which is slidably engaged in the keyway 118 of the member 108. The end faces 123 of the element 122 are oppositely beveled or inclined to slidably coact with the correspondingly inclined circumferential wall of a semi-circular recess 124 formed in the side face of the chaser slide 72.

Referring particularly to Figures 3 and 6 of the drawings, it will be noted that the recess 124 opens upon the rear side face of the slide 72. The dimensions of this opening are such with respect to the width of the element 122 that said cam element may be readily removed therethrough from the recess 124, or inserted into said recess in the assembly of said cam element with the adjusting member 108.

It will be apparent from the above description that a swivelled camming connection is established between each of the spider arms 100 and the respective chaser slides 72 so that in the axial movement of the spider relative to the cutter head, the several chaser slides are simultaneously and equally moved in the slideways 70 radially of the cutter head. The swivelled connections between elements 122 and the chaser slides assure perfect alignment of the camming surfaces regardless of minor variations in their relative angularity, and the translation of the axial movement of the adjusting members 108 to rectilinear radial movement of the slides in a direction substantially normal to the axes of members 108 without binding or excessive friction. A further advantage of this construction resides in the fact that the wearing surfaces of the elements 122 may be made extremely hard and wear resistant which would not be possible if the camming key 120 was made integral with the slide 72. Also this element 122 is of very simple, inexpensive construction and, when unduly worn, may be replaced at nominal expense.

Referring to Figures 4 and 6, the teeth of the pinion 110 are in constant engagement with a pinion 126 formed upon the rear end of a tubular shaft 128 journalled in the front section 44 of the cutter head and having its forward end disposed in an opening in the cover plate 74. This shaft end is formed with a polygonal socket 130 to receive a suitable wrench operable at the front side of the cutter head to rotate the shaft 128. Within this tubular shaft, the shaft 132 is journalled for relative rotation and the rearwardly extending end thereof is provided with the pinion 134 in constant mesh with the teeth of the pinion 112. The shaft 132 at its forward end is also provided with a polygonal socket 136 to receive an adjusting wrench. Preferably, the forward end of the shaft 128 is journalled in a bushing 138 fitted in the opening of the cover plate 74.

As shown in Figure 2 of the drawings a scale 140 is engraved upon the front face of the bushing 138 to be read in relation to an index line 142 engraved upon the forward end surface of the shaft 128. The pinion shaft assembly is restrained against forward axial movement by shoulder 144 on the shaft 128 in contact with the cutter head section 44 and shoulder 145 on shaft 132 in contact with pinion 126. It is also restrained against axial movement in the rearward direction by the axially projecting stud 146 on pinion 134 striking the rear cover plate 148 which is secured to the rear section of the cutter head by the screws 150 and closes the spaces between the radial webs 43 through which the adjusting members 108 and the pinions are assembled.

It will be evident from the above description that the several chaser slides 72 may also be independently radially adjusted in the cutter head. Referring to Figure 6, in which the adjusting member 108 is locked against axial movement relative to the spider arm 100, the chaser slide is adjusted by first applying a wrench to the front end of the shaft 132 and rotating said shaft and pinion 134. Pinion 112 is thereby moved rearwardly on stem 106. The necessary amount of adjustment of the chaser slide is then obtained by rotating the shaft 128 and pinion 126 for the required distance measured by the scale 140. Pinion 110 is thereby rotated, causing an axial movement of the adjusting member 108. Said member coacting with the key 120 of the camming element 122 results in the desired radial adjustment of the slide 72 and chaser 78 in the cutter head. Shaft 132 is now again rotated to lock the pinions 110 and 112 against rotation on the threaded stem 106 at the front and rear sides of the spider arm 100. By reason of such independent adjustment of the chaser slides, the cutting stresses are substantially uniformly distributed between the several chasers.

*Lubricating chaser slides and adjusting means*

Figure 8:
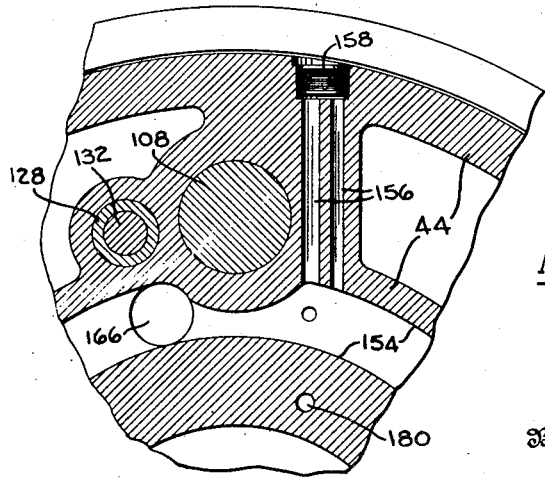
Figure 8 is a fragmentary transverse sectional view taken substantially on the line 8—8 of Figure 3.

The front cutter head section 44 is provided with an annular chamber 154 into which lubricant is introduced through the passages 156 shown in Figure 8 and retained therein by the removable plug 158. As shown in Figure 3, the lubricant passes from the chamber 154 through the orifice 159 of a seal 160 into internal passages 161 in the chaser slide 72, from which the lubricant is distributed to suitable grooves 162 formed in the opposite side faces of the slide. The seals 160 are urged into close contact with the rear faces of the slides 72 by springs 164, thus preventing the escape of any appreciable amount of the lubricant into the slideways 70. As shown in Figures 7 and 8 the lubricant is also conducted from chamber 154 by the longitudinal openings 166 and passages 168 to grooves 170 formed on the circumference of each of the adjusting members 108, thus providing adequate lubrication to insure the free axial reciprocating motion of said members in the cutter head.

*Coolant distributing means*

The head section 44 at its rear end is formed with an external circumferential groove 172 into which the open side of a channel shaped stationary coolant receiving ring 174 is fitted. Suitable means (not shown) may be provided to establish a fluid tight connection between the side walls of ring 174 and the cutter head. This ring provides an annular chamber circumscribing the cutter head into which a suitable coolant fluid is introduced from a convenient source of supply through the connecting nipple 176 provided on the ring 174. From this annular passage, the coolant is conducted through tubes 178 and passages 180 in the cutter head (Figure 3) to the distributing ducts 182, the open ends of which are located adjacent to the cutting edges of the chasers 78.

*Cutter head closing and opening means*

To the front face of the spider a flanged cap member 186 is secured by means of screws 184, the cylindrical body 188 of said cap member extending rearwardly into a central opening in the spider. The forward end of a sleeve 192 is secured to said cap member by means of the screws 190, said sleeve containing a plurality of ball bearing units 194 by means of which the spider is journalled upon the forward end of an axially movable rod or shaft 196. The bearings 194 are retained in assembled position in the sleeve by a shoulder 198 on the rod 196 and a lock nut 200 threaded in the rear end of sleeve 192. This lock nut is partially split transversely thereof and the divided parts are connected by means of the screw 202 whereby the external threads of the nut are positively locked to the internal threads of the sleeve 192. The nut is also provided with a suitable type of lubricant seal 204 seated in an annular groove internally formed in the nut.

The forward extremity of the rod or shaft 196 is threaded to receive a nut 206 which engages the outer end bearing 194 and effectively prevents any relative axial movement between the spider and the rod or shaft 196. The sleeve 192 is also provided with a lubricant seal 208 forwardly of the bearings 194 and nut 206 carries an axially adjustable cone pointed locking screw 210 engaging the end of the rod or shaft 196 and preventing undesirable relative rotation between said shaft and the nut 206.

From the above, it will be apparent that any axial movement of the rod or shaft 196 will be transmitted to the actuating spider for the adjusting members 108, thereby resulting in simultaneous radial movement of the chaser slides 72, while said rod or shaft 196 remains stationary in the rotation of the cutter head.

As shown in Figures 3 and 5 of the drawings the central opening in the rear section of the cutter head is closed at its forward end by a flanged frusto-conical member 212, the flange thereof being rigidly secured to said head section by means of the screws 213. This member 212 may be used for the purpose of coaxially positioning the end of the tubular pipe or other work piece with relation to the cutter head. However, it will be understood that this is not an essential feature of the present invention and may be dispensed with if desired.

The means for actuating the rod or shaft 196 to diametrically position the slides 72 and the cutting elements relative to the work and to control the radial movement of the slides progressively during the cutting operation to form a desired taper is incorporated in the unit 36 of Figure 1, which will now be more particularly described with reference to Figures 9 to 21 inclusive of the drawings.

This mechanism is operatively mounted and supported by the housing 214 which is rigidly secured to the rear end face of the carriage 32 by means of the screws 216 for horizontal reciprocating motion as a unit therewith. Pins 218 and nuts 220 retain the housing 214 in accurate coaxial alignment with the spindle 56 and cutter head 34.

Within the housing 214 a non-rotating cylindrical member 224 is slidably mounted and is centrally provided with an axial bore 222 to receive the rear end of the rod or shaft 196. The rear extremity of said rod is welded or otherwise rigidly secured to the forward end of a cylinder 228 which reciprocates in the cylindrical chamber 230 formed in the rear end of the member 224. Relative rotation between the member 224 and the cylinder 228 is prevented by a key 232 seated in the wall of cylinder 228 and having free sliding movement in the longitudinal keyway 234 formed in the wall of the chamber 230.

As best shown in Figure 18 of the drawing, the rear end of the housing 214 is closed by the cylindrical member 236 which is rigidly fixed to the rear end of the member 224 by means of the screws 238 and also closes the rear end of the chamber 230 in said member. A cap member 242 is rigidly secured to the rear face of the member 236 by means of the screws 240.

A relatively stationary piston 244 is assembled within the cylinder 228 to cooperate therewith and is formed or provided with a rearwardly extending rod 248. The rear end portion of this piston rod is threaded as at 246 and extends through a central opening in the member 236 and into a registering opening in the cap 242. The cylinder 228 and piston 244 constitute a double acting fluid pressure operated unit for actuating the rod 196 to move the cutting elements into and out of cutting position, and which is also bodily movable with the carriage 32 and independently axially movable with the member 224 relative to the housing 214 for effecting the taper cutting adjustment of said cutting elements.

The rear end of the cylinder 228 is closed by the cap member 250, secured thereto as shown in Figure 18 by the screws 252. This cap member is provided with a stuffing box 254 of conventional design surrounding the piston rod 248 which is fixed to the member 250 by means of the screws 256. In the periphery of the piston 244, piston rings 258 of conventional type are seated to provide an efficient working seal between said piston and the wall of cylinder 228. As will become apparent from the following description, the cylinder 228 reciprocates in the chamber 230 of member 224, relative to the stationary piston 244.

Compressed air or hydraulic pressure fluid is introduced into the cylinder 228 in advance of the piston 244 through the axial bore 262 formed in said piston and rod 248, to the rear end of which one end of a nipple 260 is connected. To the other end of this nipple a flexible tube or conduit from the reservoir or fluid pressure supply source is attached. As it is necessary to avoid the entrapment of air between the piston 244 and the forward end wall of cylinder 228, the pressure fluid is introduced into the cylinder through a recess 264 in the front end face of the piston 244. A plate 266 secured to the face of piston 244 by the screws 268 covers all of the recess 264 except a narrow end portion 270 thereof near the top of the cylinder 228, and through which the pressure fluid enters the cavity between the piston and the forward end wall of the cylinder to move the cylinder 228 forwardly and dispose the chasers in cutting position.

The walls of the housing 214 and chamber 230 are provided with registering longitudinally elongated slots or openings 272 and 274, respectively, to accommodate the nipple 276 through which the pressure fluid is supplied to passage 278 in the cap member 250. This passage communicates with an annular chamber 280 in the member 250 which is closed at its rear side by the ring 282 fixed to said cap member, with the exception of the opening 284 at the upper side of cylinder 228 through which the pressure fluid is admitted to said cylinder at the rear side of piston 244 to move the cylinder rearwardly and retract the chasers from cutting position.

*Diametral setting of chasers*

The member 236 is provided with a cylindrical recess 286 opening upon the front face thereof and in which a pinion 288 has threaded engagement upon the rear end section 246 of piston rod 248. A similar recess 290 of smaller diameter is provided in the rear face of the member 236 and receives an end flange on the elongated nut member 292 threaded upon the extremity of piston rod 248 and extending rearwardly therefrom through the cap member 242. Thus, it will be apparent that when the piston 288 and nut 292 are tightened against the base walls of the recesses 286 and 290, respectively, axial movement of the piston rod 248 with respect to member 236 is effectively prevented. The piston rod is also locked against rotative movement relative to the member 236 by means of the key 294 shown in Figure 18.

The forward end of a sleeve 296 has axial sliding engagement upon the nut 292 and intermediate of its ends is internally formed with approximately two turns of a thread of rectangular cross section as indicated at 297. This thread is engaged by a mating external thread 299 on the bushing 298 engaged upon a diametrically reduced section of the nut 292. The cap member 242 has an integral housing extension 300 enclosing the sleeve 296 and bushing 298. A key 301 in the wall of said housing is engaged in a longitudinal slot in the wall of sleeve 296 and prevents rotation thereof relative to bushing 298 and nut 292.

The housing 300 is provided with an opening 302 in its wall, as seen in Figure 19, to expose a portion of the periphery of sleeve 296. This exposed section of the sleeve wall is also provided with a helical slot 304 transversely of the opening 302, and so positioned as to expose a portion of the crest of the rectangular thread formed upon the bushing 298 and upon which a scale 306 is engraved and read with relation to the index line 308 on one of the inclined side walls of opening 304, to indicate the relative rotation between bushing 298 and sleeve 296.

The nut 292 at its rear end terminates in a polygonally formed wrench receiving portion. As seen in Figure 18, a pinion 310 on a shaft 312 journalled in the member 236 is in constant engagement with the pinion 288 threaded on the piston rod 248. The shaft 312 also extends through the cap member 242 and is provided at its rear end with a polygonally formed wrench receiving portion.

Unitary rotation of the bushing 298 with the nut 292 is obtained by means of mating splines formed on the periphery of the nut and on the interior of the bushing, as indicated at 314.

It will be apparent from the above that by rotating the shaft 312 in the proper direction, pinion 288 will be moved axially on piston rod 248 and out of contact with the base wall of recess 286, thus permitting axial movement of said rod and piston 244. The desired degree of axial movement is then obtained by rotating the nut 292 through a distance measured on the scale 306. In the unitary movement of bushing 298 with the nut 292, sleeve 296 moves axially on the nut. Since the nut 292 is held against axial movement by the members 236 and 242 engaging opposite sides of the end flange on said nut, the cooperating threaded ends of the nut and piston rod 248 will thus cause axial movement of the latter. After this adjustment has been made, the shaft 312 is then rotated to again frictionally engage pinion 288 with the member 236 and lock the piston rod against further axial movement relative to said member.

From the above, it will be evident that the cutting elements or chasers may thus be simultaneously radially adjusted and positioned at a predetermined distance diametrically from the axis of the cutter head and the work piece as axial movement is transmitted through piston 244 and cylinder 228 to the rod 196 to actuate the individual chaser slide adjusting devices, in the manner heretofore described. Referring again to Figure 19 of the drawings, it will be noted that one inclined side wall of the opening 302 in housing 300 has an index line 316 engraved thereon, which is in exact alignment with a similar line 318 engraved on the adjacent end wall of the slot 304 when the scale 306 reads zero. At opposite sides of the index line 316, plus and minus signs, respectively, are engraved on the wall of opening 302 to indicate whether rotative movement of the nut 292 is causing an increase or decrease in the diametral setting of the cutting elements or chasers.

Taper producing mechanism

The operation of mechanism for effecting a progressive radial movement of the cutting elements in synchronous relation with the relative axial movement between the work piece and the cutter head is dependent upon the axial movement of the housing 214 and the mechanism mounted thereon, which is produced by the movement of carriage 32. As is well known in the art, the carriage operating mechanism may be controlled to move the carriage and, therefore, the housing 214 and the associated mechanism toward the work at a rate dependent upon the lead of the thread to be cut.

Figure 9:
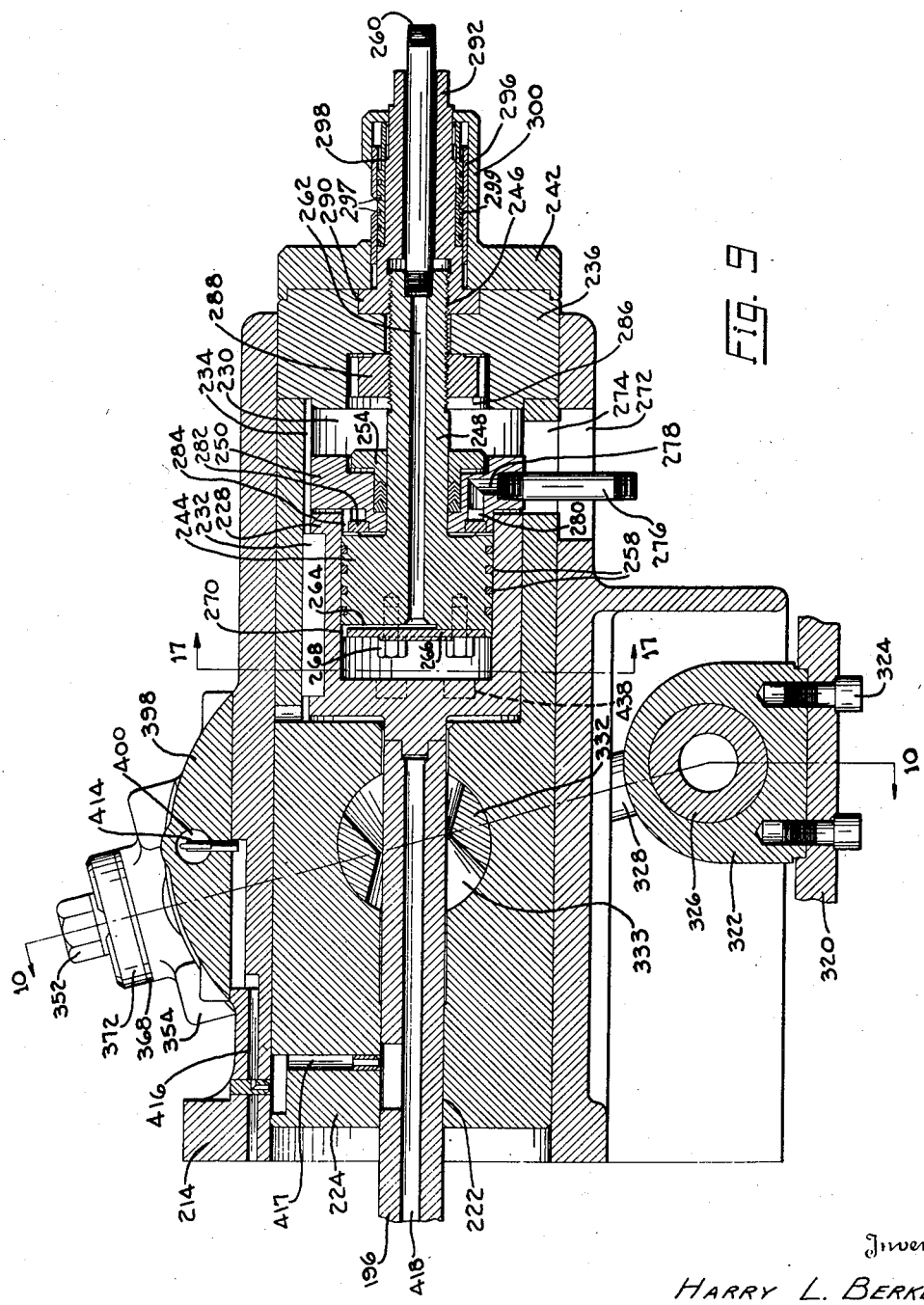
Figure 9 is a central longitudinal sectional view of the fluid pressure actuated cutter positioning and taper producing unit.

As shown in Figure 1 of the drawings, a bracket 320 is rigidly secured to the machine base 30 below the housing 214. Upon this bracket the bearing member 322, shown in Figure 9, is removably secured by means of the screws 324. A cylindrical fulcrum member 326 is oscillatably mounted in the bearing 322 and at one of its ends is provided with a transverse opening 325 in alignment with the slots 327 in the bearing 322 (Figure 11) to slidably receive the cylindrical lower end of a taper producing bar 328. As seen in Figures 10, 11 and 12 of the drawings, the bar 328 extends upwardly from the fulcrum member 326 and adjacent its upper end, and projecting from one side thereof, is provided with a pivot pin or trunnion 330. This upper portion of the taper producing bar 328 is preferably of rectangular form in cross section.

The member 224, forwardly of the chamber 230, is provided with a transverse cylindrical opening, the axis of which intersects the axis of the longitudinal bore 222 in said member, and in which the member 332 is journalled for rocking motion. This member is provided with a transverse opening 333 having a central radially elongated portion, as indicated at 334 in Figure 10, through which the rod 196 has free sliding movement and gradually flaring or increasing in vertical dimension forwardly and rearwardly therefrom, as clearly shown in Figure 9 of the drawings. As best shown in Figure 12, the member 332 is also provided in one of its ends with a rectangular slot 335 which slidably receives the taper producing bar 328.

The pin or trunnion 330 of the taper producing bar is journalled in the adjusting slide 336, a part of which extends into a recess 337 formed in one side of the member 224 and is vertically movable therethrough relative to said member. The slide 336 is enclosed within a bracket or housing 342 and is mounted for vertical sliding movement relative thereto by means of the keys 338 and 340 fixed in opposite sides of the slide 336 and having sliding movement in keyways formed in the bracket or housing. This bracket is rigidly secured to the housing 214 by means of screws 334, and, as seen in Figure 13, is of generally circular outline form, having the cylindrical boss or extension 346 projecting with slide 336 into the recess 337 of member 224, as above described.

To the slide 336, the lower end of an upwardly extending threaded rod 350 is securely fixed by means of the pin 348. This rod, the slide 336 and the pivot or trunnion 330 of the taper producing bar 328 are retained in a vertically adjusted position relative to the members 224 and 332 by means of the nut 352 threaded upon the upper end of the rod 350. By thus locating the axis of the taper producing bar pivot 330 at a predetermined position above the axial center of the member 332, as the pivot 330 is constrained to move horizontally as a unit with the housing 214, the taper producing bar 328 will be swung forwardly at the upper end thereof as the housing 214 progressively moves in the forward direction during the threading operation. The bar or lever 328 pivots about the axis of member 326 which freely oscillates in the bearing 322 and automatically adjusts itself to any angular position of the bar 328. Since the axial centers of the pivot 330 and member 332 are at different vertical distances from the center of pivotal movement of the bar 328, it will be evident that the member 332 will be moved forwardly at a different rate of speed from the pivot 330 and, in the illustrated case, at a slower rate of speed. Through the member 332 a corresponding bodily forward movement is transmitted to the member 224 and the fluid pressure operated device mounted therein relative to housing 214, together with the rod 196. In this manner, a positively controlled radial movement of the cutting elements occurs progressively during the cutting operation, to thus form a thread of a desired taper on the work. It will also be observed that this radial movement of the cutting elements or chasers is accomplished without disturbing the existing relative axial positions of the fluid pressure operated cylinder 278 and the piston 224.

Taper adjusting device

It will also be evident from the above description that the difference in the rate of forward travel between the rod 196 and the taper producing bar pivot trunnion 330, and therefore the degree of taper to be formed on the work, is dependent upon the distance between a horizontal plane containing the axis of rod 196 and member 332, and a similar plane containing the axis of the pivot 330. This distance is adjusted to a desired predetermined value by means of a mechanism somewhat similar to that previously described for the diametrical adjustment of the cutting elements, and which will now be described with particular reference to Figures 10, 14 and 15 of the drawings.

The top of the slide housing 342 is closed by a cap member 354 secured to said housing by the screws 355 (Figure 13). Below this cap member a pinion 356 has threaded engagement upon the rod 350. With the nut 352 seated at its lower end in a recess 353 in the cap member 354 and the pinion 356 engaged with the lower face of said cap member, it is obvious that the rod 350 is securely locked against axial movement in said cap member. The pinion 356 is axially displaced on rod 350 out of contact with member 354 by means of the constantly meshed pinion 358 on the lower end of shaft 360 journalled in the member 354. By applying a wrench to the polygonal upper end 362 of said shaft, the pinion 356 is axially moved on rod 350 upon rotation of pinion 358 in the proper direction. Nut 352 is then turned to vertically adjust the rod 350 and the taper producing bar pivot 330 to a predetermined position. The lower flanged end of the nut 352 is retained in the recess 353 by means of a collar 364 which is secured in a relatively large recess in member 354 by means of the screw 366.

I have also provided means of a very novel character for obtaining an extensive range of taper adjustments in accurately measured small increments, illustrated more particularly in Figures 10, 13, 14 and 15 of the drawings. With reference thereto a plate 368 is supported upon member 354 and is provided with suitable openings to receive the nut 352 and shaft 360. A ring 370 is seated upon the plate 368 and surrounds nut 352. The inner surface of this ring and the outer periphery of the nut are provided with axially extending interlocking serrations as indicated at 371 whereby said nut and ring are connected for unitary rotation upon the rod 350. The plate 368 carries a cap member 372 secured to said plate by screws 374. The cap member 372 with the entire assembly is secured to the cap member 354 by means of the screws 376. The cap member 372 has an opening closely surrounding the shaft 360 and is also provided with a relatively large cylindrical opening 373 concentric with rod 350 and ring 370 but of substantially greater diameter than said ring.

Between the ring 370 and the cap member 372, a cage member 378 is seated upon the plate 368. This annular cage member is provided with equidistantly spaced radial openings 382 therein to loosely receive the hardened steel balls 384.

The cage member 378 has a reasonably close fit around the ring 370, and the latter is provided in its periphery with a groove 386 of semi-circular cross sectional form having a diameter approximately equal to that of the balls 384. This groove is interrupted by the protuberance 388 projecting radially from the base of the groove to the periphery of the ring. This protuberance is provided on each side thereof with the relatively shallow grooves indicated at 390, respectively, forming continuations of the ends of the groove 386 and also the same radius as the ball 384.

The cap member 372 is provided with a bore or socket 391 disposed radially of the opening 373 and communicating at its inner end therewith. In this socket, the member 392 is secured and at its inner end projects slightly beyond the face of the opening 373 as indicated at 393 for a purpose which will be presently described. The member 392 has an axial bore in which a cylindrical detent 394 of slightly less diameter than the openings 382 in the ring 378 is slidingly engaged. This detent has a tubular end providing a seat for the spring 396 which yieldingly urges said detent inwardly toward the cage ring 378.

As shown in Figure 14, the cap member 372 at one end thereof adjacent the nut 352 is slotted or cut away as at 380 to expose the top surfaces of the ring 370 and the cage ring 378. Upon these surfaces measuring indicia is engraved and is arranged to measure increments of taper in inches per inch and as shown is set to indicate the most popular taper, .0625 inch per inch, or ¾" per foot.

When a greater or less taper is desired, the nut 352 is rotated in the appropriate direction as above described. Ring 370 rotating with nut 352 will measure the third digit of the scale, the fourth being estimated. It will be noted from reference to Figure 15 that the detent 394 being resiliently forced into one of the openings 382 in cage ring 378 establishes a positive position of said cage ring with respect to the stationary cap member 372. Thus the ball in said opening 382 is forced inwardly into the groove 386 in the ring 370. In a complete revolution of the ring 370, the protuberance 388 will be brought into contact with said inwardly projecting ball and, as the ball moves into the shallow groove section 390, it will be forced outwardly in the cage ring opening and move the detent 394 outwardly against the resistance of the spring 396 until the inner end face of the detent is flush with the adjacent end face of the member 392 and the outer periphery of the cage ring 378. The ball 384 is then positioned in the shallow portion 390 of the groove 386 and the outer end of the detent 394 is in abutting contact against the base of the bore in member 392 so that the ball cannot enter the inner end of said bore. The cage ring 378, being no longer restrained against rotation by detent 394, will now be rotated with ring 370 until the following opening 382 in the ring is brought into alignment with the detent 394 when said detent will be projected inwardly by spring 396 into said opening and further rotation of cage ring 378 will be stopped. At this time the first ball 384, which was seated in the shallow portion 390 of groove 386, will have passed beyond the projecting inner end 393 of member 392, and in the further rotation of ring 370 will be forced outwardly by the protuberance 388 so that the rotation of ring 370 continues independently of the cage ring 378. Thus another second digit on the surface of ring 378 will be exposed through the opening 380 in member 372, and will remain in view for one complete revolution of the nut 352 and ring 370.

The serrated connection 371 between the nut 352 and ring 370 provides a convenient calibrating means. The taper producing mechanism, when assembled, is set to produce a particular definite taper. The indicating mechanism may then be separately assembled and set to the same taper and then mounted in correct position without rotating the ring 370, which would change the setting of the taper on the indicating scale.

*Lubricating taper producing mechanism*

Referring again to Figure 10 of the drawings, the housing 214 is provided with a top cover 398 having an oil reservoir 400 to which a suitable lubricant may be supplied from any convenient source. A plurality of wicks 402 conduct lubricant from this reservoir into the several tubes through which the lubricant is continuously fed to all wearing surfaces of the taper producing mechanism. Tube 404 supplies lubricant to the pivot pin or trunnion 330 of the taper bar 328 while the tube 406 supplies lubricant to all external surfaces of said taper producing bar. Lubricant is conducted to the bearing surface of member 332 through tube 408 and passage 409 in the member 224. Tube 410 feeds the lubricant to the groove 412 on the periphery of member 224 while tube 414 (Figure 9) feeds lubricant by way of the passage 416 and passage 417 in member 224 to the axial bore 418 through the rod or shaft 196. The forward end of this bore opens radially at 419 (Figure 3) into the tubular shank 98 of the spider and thus constantly supplies lubricant between the relatively sliding surfaces of said shank and the hub extension 54 of the cutter head 34, as clearly seen in Figure 3 of the drawings. The tube 420 is connected by means of suitable passages (not shown) with the bearing surfaces between the cylinder 228 and the wall of chamber 232.

Setting taper mechanism for external or internal taper

As seen in Figures 10, 20 and 21, to the side of the bracket 320 adjacent the taper adjusting mechanism, a horizontal flat metal strip 424 is secured by means of screws 422. As seen in Figure 20 this strip is provided with an engraved scale 426 which, in connection with the index line 428 on a depending part 430 of the housing 342, measures the rectilinear travel of said housing and the taper adjusting mechanism relative to the stationary bracket 320, thus measuring the length of the thread cut on the work.

It has been found convenient, in the cutting of both internal and external tapers, to have the taper producing bar 328 oscillate for the same degree at each side of a vertical position. Therefore, at either the start or finish of the cutting operation, the taper producing bar will be inclined at a substantial angle to the vertical, which, considering the average of thread lengths to be cut by the mechanism, has been selected in this embodiment of the invention as fifteen degrees. In the case of external threading, all diametral adjustments are necessarily made on the basis of the end of the cut at which the taper merges with the known external diameter of the work-piece, as it is apparent that due to the taper a diameter selected at any other point could not be easily determined without calculation.

It will be noted that any change, which may be made in the taper setting by the adjusting mechanism above described, has an effect on the diametral setting of the cutting elements or chasers in proportion to the angle of inclination between the taper producing bar 328 and the adjusting rod 350. If, for instance, the taper adjusting mechanism, including rod 350, is inclined fifteen degrees clockwise from the vertical, as shown in Figure 20, and taper producing bar 328 is parallel thereto, no horizontal movement of shaft or rod 196 results from a taper adjustment and hence the diametral setting is not changed. If the taper producing bar 328 were not parallel to the rod 350, when a taper adjustment is made, the rod or shaft 196 would be moved horizontally, resulting in a change in the diametral setting of the cutting elements in proportion to the degree that the taper producing bar was out of parallelism with the adjusting rod 350.

It will be understood from the above that, in any single selected position at which the taper adjusting mechanism may be placed, in such position the taper producing bar 328 is parallel to the adjusting rod 350, so that the diametral setting at said selected position is not affected by a change in taper setting, regardless of the point in the travel of the taper producing bar 328 at which such change may be made.

Therefore, since such a condition of parallelism between the taper producing bar 328 and adjusting rod 350 is desirable only at the end of the cut in the case of an external thread, the position of the taper adjusting mechanism shown in Figure 20 is adapted for external threading. It should be understood that, in the position shown, the thread has been completed and that the taper producing bar 328 is parallel to the taper adjusting mechanism. At the beginning of the threading operation, the index 428 would be set at the point on scale 426 indicating the desired thread length and taper producing bar 328 would be inclined, assuming a usual thread length of four and one-half inches, in counterclockwise direction from the vertical approximately equal to the clockwise inclination of the adjusting rod 350. It will be noted that for the cutting of external threads the operation is measured as proceeding from the number on scale 424, indicating the thread length, to zero, at which point the fluid pressure operated unit above described is actuated to retract the cutting elements from operative engagement with the work.

In the internal threading of a tubular workpiece, all diametral adjustments are necessarily made on the basis of the beginning of the cut since it is here that the diameter is the same as that of the cylindrical portion of the externally threaded member, and it is at this point that pipe fittings and similar products are customarily measured. As a result, the above considerations with regard to the cutting of external threads are reversed and the taper adjusting mechanism enclosed within the housing 342 must be inclined in the counterclockwise direction from the vertical, while the threading operation starts from the zero point on scale 426 with which a second index line 432 on the extension 430 is aligned. This position of the taper adjusting mechanism is shown in Figure 21 of the drawings.

In order to change the position of the adjusting mechanism from that shown in Figure 20 to that of Figure 21, the screws 344 are removed. It will be noted that the wall of the housing 214 is provided with two additional tapped openings in excess of the number of the screws 344 so that after housing 342 has been rotated from the position of Figure 20 to that of Figure 21 (about an axis coincident with the axis of member 332), two of the screws may then be inserted in the holes 434 of Figure 20 while the holes 436 in Figure 21 remain empty.

It will be noted that the housing 214 is inscribed on its side with the explanatory notations: "External threads. Die head opens at 0" and "Internal threads. Tapping starts at 0." These notations are so placed that the one which is inapplicable is covered by the extension 430 of the housing 342.

Referring again to Figure 9, it will be seen that the heads of the screws 268 which secure plate 266 to piston 244 project from the face of said plate. In the cutting of external threads, these screw heads are received in the recesses 438 formed in the end wall of cylinder 228 thus permitting of the full travel of said cylinder. In the case of internal threading, this travel of the cylinder 228 must be reduced because of space limitations in the cutting mechanism. This is accomplished by first removing screws 238 (Figures 16 and 18), and then rotating the entire assembly including member 236, cap section 242, pinion 288 and piston 244 to register the tapped holes 440 in member 224 (Figure 16) with the screw receiving openings in member 236. The assembly is then again secured by the screws 238 in rigidly assembled relation to the member 224, whereby the screws 268 are positioned out of alignment with the recesses 438 in the end wall of cylinder 228. Thus, when the cylinder 228 is forced rearwardly by the admission of pressure fluid through the connection 276, the forward end wall of said cylinder will strike the screw heads 268 and thereby limit the rearward travel of the rod or shaft 196. Setting of the screws 268 for internal or external threading is indicated by the index line 433 on the peripheral surface of cap 242 and ribs 435 and inscriptions 437 on the surface of housing 214, as shown in Figures 20 and 21.

Internal cutting head

In Figure 22 of the drawings, I have shown another type of cutter head for use in internal threading which is interchangeable with the cutter head 34. This interchangeable cutter head includes a rear body section 442 and a front section 444 which may be of any desired selected diameter and is rigidly attached to the rear section 442 by means of suitable screws 446. The head section 444 carries thread cutting elements or tap chasers 448 radially movable in slots formed in said section. The chasers 448 adjacent their inner ends are provided with grooves 450 obliquely inclined relative to the head axis which slidingly receive the tongues 452 formed on the frusto-conical plunger head 454. This construction is well known in the art, and it will be apparent that, in the advanced position of the plunger head 454, the chasers 448 are in their maximum diametrical setting relative to the axis of the cutter head and, when the plunger head 452 is at the limit of its rearward movement, the chasers are positioned at their minimum diametrical setting.

The rear body section 442 of the cutter head is provided with slots 456 in its forward end surface (Figure 23) for the reception of keys 458 secured therein by means of screws 460. In the assembly of the two head sections, these keys are received in suitable recesses 445 formed in the read end of the front head section 444 so that accurate alignment of the two head sections and unitary rotation thereof is assured.

The cutter head section 442 is provided at its rear end with a coupling flange, the periphery of which is threaded as at 462 for engagement by the internal threads of the nut 60 of Figure 3, said flange having a rearwardly projecting portion 464 of reduced diameter to accurately center the cutter head with respect to the driving spindle 56. The rear face of the coupling flange is also formed with the keyway 465 to receive the key 58 on the end of the driving spindle.

As seen in Figures 3 and 22, in the interchangeable connection of the cutter heads with the driving spindle 56 and the rod or shaft 196, the sleeve 192 and all of the parts associated therewith remain in assembled relation on the end of the rod 196. In the application of the cutter head of Figure 22, the sleeve 192 is received within a hollow cylindrical member 466 having a forward end wall provided with an internal abutment shoulder 438 contacting the forward end of sleeve 192 and centrally formed with a recess 470 to receive the forwardly projecting end of nut 206. Member 466 is secured in rigidly assembled relation with sleeve 192 by means of screws 469 threaded into tapped openings in the forward end of sleeve 192, which receive the screws 190 of Figure 3.

The plunger rod or system 472 has a cylindrical head 474 formed on its rear end which is seated in an internal recess 475 provided in the end wall of member 466. The forward end of the rod or stem 472 has threaded engagement in the tapped axial bore 476 of the plunger 454. A spacing sleeve 478 surrounds the stem 472 between the rear end of plunger 454 and the member 466, establishing a definite axially spaced relationship between said member and the plunger 454.

As shown in Figure 25, the head 474 of the plunger rod 472 is provided with a diametrical opening 482 with a spring 480 therein resiliently urging the balls 484 outwardly from the ends of said opening and into engagement with the axially extending teeth or serrations 486 formed on the wall of the recess 475. By providing an uneven number of the teeth 486, as shown, one of the balls 484 is in contact with the oppositely inclined surfaces of two adjacent teeth 486, thus providing resistance to relative rotation between the member 466 and rod 472. This resistance is sufficient to prevent rotation of rod 472 by vibration or other accidental cause relative to plunger head 454 but not sufficient to prevent manual rotation of the rod for the purpose of adjusting the chasers. Preferably, the forward end of rod 472 has a wrench receiving socket for manual rotation thereof. As seen in Figure 22, the member 466 carries a key 485 having axial sliding engagement in the keyway 487 formed in the rear cutter head section 442. Thus, it will be apparent that the sleeve 192 and member 466 have unitary rotation with the cutter head while they are also axially movable as a unit with rod 196 relative to the cutter head to transmit radial movement to the cutting elements or chasers 448.

A front plate or cap member 488 secured to cutter head section 444 by the screws 490 retains the chasers 448 in correct axial position in the cutter head. The front end of the central opening 494 in the cap 488 which accommodates plunger 454 is closed by means of a suitable cover plate 492 frictionally fitted in a recess in the front face of cap 488.

A coolant supply ring 496, similar to the stationary ring 174 shown in Figure 3, is mounted in the circumferential groove 498 formed in the periphery of the cutter head section 442. The coolant is conducted through the passages 500 in head section 442 and the seal 502, which prevents leakage of the fluid at the joint between the two head sections, to an annular groove 504 formed in the rear face of the front section 444 of the cutter head. The rear side of the groove 504 is closed by the ring 506 and the coolant flows from said groove through the several passages 508 extending longitudinally of the head section 444 from which it is discharged through openings 510 adjacent the cutting edges of the chasers 448.

In cutting an external or internal tapered thread, the appropriate type of cutter head, shown in Figures 3 and 22 respectively, is selected and connected with the drive spindle and bearing sleeve 192 on the forward end of rod 196, as above explained. Piston 244 is then adjusted in the manner previously described and pressure fluid supplied through connection 260 to cylinder 228 to axially move rod 196 forwardly and adjust the thread cutting chasers radially inwardly or outwardly in the cutter head to a predetermined starting diameter. It will be noted that in a forward movement of rod 196, while the die head is stationary, the chasers of the external cutter head would be moved inwardly while the chasers of the internal cutter head would be moved outwardly. The taper producing bar 382 and its adjusting unit 342 are then adjusted with respect to rod 196 as above described in connection with Figures 20 and 21, in accordance with the selected type of cutter head and the required amount of taper. The machine is now operated to move the carriage 32 and die head 34 forwardly as said head is rotated with respect to the stationary pipe or workpiece, with the extreme end of which the thread cutting chasers have initial contact, externally or internally of the pipe wall. In this rotation and forward axial movement of the die head, the taper producing bar 382 is synchronously actuated in the manner above described to cause a rearward axial movement of rod 196 relative to the die head, since the latter moves forwardly at a faster rate of speed, and progressively adjust the position of the thread cutting chasers radially of the pipe to generate a thread thereon having the desired longitudinal taper. It will be noted that owing to the arrangement of the cams 118 and 450 at reverse inclinations with respect to the axes of the external and internal die heads respectively, the chasers are properly adjusted by movement of the rod 196 in the same direction relative to the die head and in cutting an external tapered thread, the chasers are moved outwardly, while in cutting an internal thread, the chasers are moved inwardly. At the end of the thread cutting operation pressure fluid is supplied through the connection 276 to disengage the chasers from the work.

From the foregoing description and the accompanying drawings, it will be seen that I have provided a machine tool of maximum utility having readily interchangeable cutter heads whereby the machine may be easily converted for externally or internally cutting the work-piece and, if desired, provide the same with a tapered or non-tapered thread. The invention is further characterized by the novel and simply constructed mechanism, common to both types of cutter heads, for controlling the diametrical position of the cutting elements relative to the work, and for producing a taper in predetermined selected ratio to the length of the cut. Also the invention provides a very compact space conserving organization of the several units, and by the mounting and arrangement of the cutter mechanism and the taper producing and adjusting mechanism, on opposite ends of the carriage 32, a balanced distribution of the load on said carriage is obtained.

However it will be understood that certain of the novel features of the present disclosure, such as the individual means for adjusting the cutting elements or chasers, and the fluid pressure actuated means for controlling the movement of the chasers in the cutter heads, to and from cutting position, may also be employed in connection with machines of that type in which the work is moved axially relative to the cutter head, or in which the latter remains stationary while the work is both rotated and axially moved with respect thereto.

It will further be seen that in the unique assembly and arrangement of the several cooperating mechanisms, easily accessible means is provided for quickly and accurately making such adjustments as may be required, together with effective means for adequately lubricating the chaser slides and the individual adjusting means therefor, as well as the relatively moving parts of the taper control mechanism.

Finally, it may be said that my present improvements provide a greatly simplified machine of this type, embodying new principles of construction and operation, whereby, as distinguished from prior efforts in this art, I am able to acceptably meet the exacting demands of modern industry for extreme accuracy and consistently uniform results.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine tool, a cutter head, a plurality of cutting tools mounted in said head for radial movement toward and from the axis thereof, adjusting devices individual to said cutting tools, a common operating member connected with each of said adjusting devices, means for actuating said member to simultaneously operate said adjusting devices and diametrically position the cutting edges of the tools with respect to the work, and means individual to said devices having a portion extending to the front of the cutter head for manual operation to selectively operate the respective adjusting devices independently of said member and radially adjust the individual cutting elements in said head.

2. In a machine tool, a cutter head, a tool slide adjustably mounted in the cutter head to radially position a tool thereon relative to the axis of the head, and adjusting means for said slide comprising a member axially movable in the cutter head and connecting means mounted on the slide for angular movement relative thereto including thrust transmitting parts movably connected with said slide and member, respectively, to radially adjust said slide in the axial movement of said member.

3. The machine tool as defined in claim 2, in which said thrust transmitting parts include a cam element rotatable about an axis substantially normal to the path of movement of the tool slide.

4. The machine tool as defined in claim 2, in which the tool slide is provided with a semicircular recess in one side opening upon one longitudinal edge thereof, and wherein said thrust transmitting parts include a cam element insertible through said opening for rotation within the recess about an axis substantially normal to the path of movement of the tool slide.

5. A cutter head for machine tools, a plurality of chaser slides mounted in the cutter head to radially position the chasers, adjusting devices individual to the slides and each including an element movable in the cutter head axially thereof and having means coacting with a part on the associated slide, a common operating member mounted in the cutter head and operable independently thereof, and adjustable means individual to said axially movable elements coacting with said operating member to effect simultaneous adjustment of the slides in the operation of said member or the selective independent adjustment thereof relative to said member.

6. The cutter head for machine tools as defined in claim 5 together with means for operating said adjustable means comprising means for positioning said adjustable means, and separate means for locking said adjustable means in its adjusted position.

7. The cutter head for machine tools as defined in claim 5, in which manually operable means for actuating said individually adjustable means is mounted in the cutter head to effect the selective adjustment of the slides and to rigidly lock said axially movable elements against movement relative to said operating member.

8. In a taper thread cutting mechanism, a reciprocable carriage, a cutter head rotatably mounted on said carriage for bodily axial movement therewith, a plurality of chaser carrying slides adjustably mounted in said cutter head to radially move the chasers relative to the axis thereof, adjusting means for said slides mounted on the cutter head, a member mounted on the carriage for movement relative thereto in coaxial relation with the cutter head, power actuated means carried by said member and operatively connected with said slide adjusting means to move the chasers into and out of cutting relation with the work, a taper producing lever pivotally mounted on the carriage, a relatively stationary fulcrum for one end of said lever, and means pivotally connecting said lever with said member to move said member and the power actuated means as a unit in the angular movement of said lever relative to the carriage, and impart a synchronous radial movement to the chasers during the thread cutting operation.

9. The thread cutting mechanism as defined in claim 8, wherein said lever is pivotally mounted in a slide on said carriage, together with means for adjusting said slide to position the lever pivot relative to the axis of the pivotal connection between the lever and said member and variably control the degree of taper.

10. The thread cutting mechanism as defined in claim 8, in which the taper producing lever is pivotally mounted in a supporting bracket, together with means for adjustably positioning said bracket and lever on the carriage to selectively dispose said lever in either one of two angular positions relative to its pivotal connection with said member, for the cutting of external or internal threads.

11. The machine tool as defined in claim 1, together with a stationary coolant supply ring circumscribing the cutter head and coolant distributing passages in the cutter head connecting said ring with the cutting tools.

12. In a machine tool, a cutter head, a cutting tool radially movable in the head toward and from the axis thereof, adjusting means mounted on the cutter head and operatively connected with said tool, an operating member connected with a part of said adjusting means and extending rearwardly from the cutter head, actuating means for said member to move the tool into or out of cutting position, and means controlling operation of said member, independently of its operation by said actuating means, to actuate said adjusting means and progressively move the tool radially of the work during the cutting operation.

13. In a machine tool, a cutter head, a cutting tool radially movable in the head toward and from the axis thereof, adjusting means mounted on the cutter head and operatively connected with said tool, a power actuated operating unit for said tool adjusting means, and taper producing means operatively connected with a part of said operating unit to actuate the same independently of the power operation of said unit, and operate the adjusting means to progressively recede the tool from the work during the cutting operation.

14. In a machine tool having a cutter head and a plurality of cutting tools movable in the head toward and from the axis thereof, adjusting means for said tools, means operatively connected to said adjusting means to set the tools in a predetermined position diametrically of the cutter head, and taper producing mechanism including means synchronously operable in relative axial movement between the cutter head and work to impart a unitary bodily movement to said last named means and actuate said adjusting means to progressively adjust said tools and generate a tapered surface on the work.

15. In a machine tool, a cutter head, a plurality of cutting tools movable in the head toward and from the axis thereof, means for adjusting said tools simultaneously into or out of cutting position with respect to the work, power operated means for actuating said adjusting means, and additional means automatically responsive to a relative axial movement between the cutter head and work to synchronously actuate said adjusting means independently of its actuation by said power operated means and progressively adjust the tools during the cutting operation to form a surface of predetermined contour on the work.

16. A machine tool as defined in claim 15, wherein said power operated means includes a reciprocable part and means operatively connecting said part with the tool adjusting means, and said additional actuating means includes a member operatively connected to actuate said connecting means independently of the power operation of said reciprocable part.

17. A machine tool as defined in claim 15, wherein each of said actuating means is operatively connected by a common motion transmitting connection with said tool adjusting means.

18. In a machine tool, an axially movable cutter head, a plurality of cutting tools movable in the head toward and from the axis thereof, power operated means for simultaneously initially adjusting said tools into or out of cutting position with respect to the work, a support for said power operated means movable in a path axially parallel with the cutter head, and means mounted for movement with and relative to the cutter head and operatively connected with said support to bodily move the power operated means relative to the cutter head and synchronously adjust the cutting tools during the cutting operation to produce a predetermined surface contour on the work.

19. A machine tool as defined in claim 18, wherein said last named means comprises a taper producing lever fulcrumed at one end for movement with the cutter head and slidably mounted at its other end in a rockable bearing to control the adjustment of the cutting tools and generate a tapered surface on the work.

20. A machine tool as defined in claim 18, wherein said last named means comprises a taper producing lever fulcrumed at one end for movement with the cutter head and slidably mounted at its other end in a rockable bearing to control the adjustment of the cutting tools and generate a tapered surface on the work, together with means for adjusting said lever to position its fulcrum axis relative to the path of movement of said support.

21. A machine tool as defined in claim 18, wherein said power operated means comprises a fluid operated piston and cylinder unit.

22. In mechanism for generating a tapered surface on a work piece, a carriage, a cutter head rotatably mounted on said carriage for bodily axial movement therewith, a plurality of chaser carrying slides adjustably mounted in said cutter head to radially move the chasers relative to the axis thereof, adjusting means for said slides mounted on the cutter head, power actuated means operatively connected to said slide adjusting means to move the chasers to a predetermined diametrical position in the cutter head, and taper producing mechanism including a member mounted for movement with the carriage and in angular relation thereto and operatively connected with a part of said power actuated means to effect a progressive synchronous operation of said adjusting means in the axial movement of the cutter head.

23. In combination with an axially movable thread cutting head and supporting carriage therefor and tool adjusting mechanism mounted in said head, an actuating member for said mechanism axially movable in substantially parallel relation to the cutting head, taper producing mechanism including a lever angularly movable in a vertical plane substantially parallel to the axis of said actuating member and operatively connected therewith, a slide mounted on the carriage, a fulcrum pin for said lever mounted in said slide, and adjusting means for said slide to position the fulcrum axis of the lever relative to said actuating member and variably control the effective operation of said member by said lever.

24. The combination defined in claim 23, in which said slide adjusting means includes a primary manually operable member and micrometer means operatively connected with said member and actuated thereby to measure small increments of adjustment of said slide.

25. The combination defined in claim 23 together with a mounting bracket for said slide and its adjusting means, and means for adjustably securing said bracket on said carriage to selectively dispose said slide and lever in either one of two angular positions relative to the connection between said lever and said actuating member for the cutting of external or internal threads.

26. In a machine tool, a cutter head, a tool carrying slide adjustably mounted in said head to position a cutting tool relative to the work, an adjusting member for said slide mounted in the cutter head and movable in a path substantially normal to the path of movement of the slide, and a swiveled motion transmitting element operatively connecting said adjusting member with the slide.

27. In a machine tool, a cutter head, a cutting tool radially movable in the head toward and from the axis thereof, relatively movable means operatively connected with said cutting tool and wholly enclosed within the head to radially adjust the tool and diametrically position its cutting edge with respect to the work, an operating member connected with a part of said adjusting means and extending rearwardly in co-axial relation with the cutter head, actuating means for said member to move the tool into or out of cutting position, and additional means operatively connected with said member and controlling operation of said member independently of its operation by said actuating means to actuate said adjusting means and progressively move the tool radially of the work during the cutting operation.

28. In a machine tool, a cutter head, a cutting tool radially movable in the head toward and from the axis thereof, relatively movable means operatively connected with said cutting tool and wholly enclosed within the head to radially adjust the tool and diametrically position its cutting edge with respect to the work, an operating member connected with a part of said adjusting means and extending rearwardly in co-axial relation with the cutter head, power actuated means operatively connected with said operating member to move the tool into or out of cutting position, and taper producing means operatively connected with said member and controlling operation of said member independently of its operation by said power actuated means to actuate said adjusting means and progressively recede the tool from the work during the cutting operation.

29. In a machine tool, a cutter head, a plurality of tool slides adjustably mounted in the cutter head to radially position tools thereon relative to the cutter head axis, and means for simultaneously adjusting said slides including a camming element movably mounted on each slide, and a coacting member slidably mounted in the cutter head, a spider operatively connected with each of said members, and means for actuating said spider relative to the cutter head including an axially movable shaft together with bearing means transmitting axial movement of the shaft to said spider and supporting the latter for unitary rotation with the cutter head relative to said shaft.

30. In a machine tool, an axially movable cutter head, a plurality of tool slides adjustably mounted in the cutter head to radially position tools thereon relative to the cutter head axis, and means for simultaneously adjusting said slides including a camming element movably mounted on each slide, and a coacting member slidably mounted in the cutter head, a spider operatively connected with each of said members, and means for actuating said spider relative to the cutter head, including an actuating unit operatively connected with the spider to actuate the slide adjusting means and move the tools to and from operative position relative to the work, together with a member operatively connected with said unit and movable with the cutter head in the axial movement thereof to bodily move said actuating unit in a parallel path with the cutter head and actuate said adjusting means to progressively move the tools radially in the cutter head during the cutting operation.

31. In a machine tool, a reciprocable carriage, a cutter head rotatably mounted on one end of said carriage for bodily axial movement therewith, a plurality of tool carrying slides adjustably mounted in said head, means associated with said head for simultaneously adjusting said slides and holding the tools in cutting engagement with the work during axial and rotary movement of said head and a reciprocating motor unit mounted on the opposite end of said carriage in co-axial balancing relation with said head and operatively connected with said slide adjusting means.

32. The machine tool as defined in claim 31 wherein said carriage comprises connecting means to detachably and selectively receive external and internal taper thread cutter heads and said motor unit is adapted to selectively actuate the said slide adjusting means of either of said cutter heads.

33. In a machine tool, a reciprocable carriage, a cutter head mounted on said carriage for bodily axial movement therewith, a plurality of tool carrying slides adjustably mounted in said head, means associated with the cutter head for simultaneously adjusting said slides, a reciprocating motor unit mounted on the carriage and operatively connected with said slide adjusting means, and means for bodily adjusting said motor unit axially of the cutter head, to actuate said slide adjusting means in accordance with a predetermined diametral setting of the cutting tools.

34. In a machine tool, a reciprocable carriage, a cutter head mounted on said carriage for bodily axial movement therewith, a plurality of tool carrying slides adjustably mounted in said head, means associated with the cutter head for simultaneously adjusting said slides, a reciprocating motor unit mounted on the carriage and operably connected with said slide adjusting means, a taper producing lever movable as a unit with the carriage and pivotally movable relative thereto, and means operatively connecting said lever with said reciprocating motor unit to bodily move the latter axially of the cutter head and actuate the slide adjusting means to progressively move the cutting tools radially of the work during the cutting operation.

35. In a machine tool, a cutter head, a plurality of tool slides adjustably mounted in the cutter head to radially position tools thereon relative to the cutter head axis, means for simultaneously adjusting said slides including a camming element movably mounted on each slide, and a coacting member slidably mounted in the cutter head, a spider operatively connected with each of said members, means for actuating said spider relative to the cutter head, and means for lubricating the tool slides and adjusting means therefor from a common source carried by the cutter head.

36. In a machine tool, a cutter head, a plurality of tool slides adjustably mounted in the cutter head to radially position tools thereon relative to the cutter head axis, and means for simultaneously adjusting said slides including a camming element movably mounted on each slide, and a coacting member slidably mounted in the cutter head, a spider operatively connected with each of said members, means for actuating said spider relative to the cutter head, a lubricant chamber in the cutter head, and passages for distributing lubricant from said chamber to the tool slide adjusting means.

37. In a machine tool having a tool carrying head and a plurality of tools movable in the head toward and away from the axis thereof, adjusting means for said tools, a power operated unit comprising a piston member and a cylinder member, one of which members is operatively connected with said adjusting means, and manually operable means directly connected with the other of said members for axially adjusting the same relative to said one of said members for conditioning the effective power operation of said unit to selectively predetermine the diametrical setting of the tools in the cutter head.

38. In a machine tool, a cutter head, a cutting tool radially movable in the head toward and away from the axis thereof, and relatively movable adjusting means wholly enclosed within the head including a member axially movable in the cutter head and connecting means having a swiveled motion transmitting element between said member and the cutting tool operable to translate axial movement of said member into radial movement of the tool to radially adjust the tool and diametrically position its cutting edge with respect to the work, and additional means mounted in the cutter head to actuate said connecting means and radially adjust the cutting tools independently of said member.

39. In a machine tool, a cutter head, a plurality of cutting tools mounted in said head for radial movement toward and away from the axis thereof, adjusting devices having swivel motion transmitting elements individual to said cutting tools, a common operating member, adjustable means operatively connecting each of said adjusting devices with said member for simultaneous operation to diametrically position the cutting edges of the tools with respect to the work, and means comprising members axially mounted in said cutter head extending inwardly from the front side thereof and being operatively connected with said adjustable means for manual operation from the front side thereof to selectively actuate said adjusting devices and radially adjust the individual cutting elements in the cutter head.

HARRY L. BERKEY.

REFERENCES CITED

The following references are of record in the file of this patent:

UNITED STATES PATENTS

| Number | Name | Date |
| --- | --- | --- |
| Re. 20,974 | Guirl et al. | Jan. 10, 1939 |
| 225,305 | Stott | Mar. 8, 1880 |
| 397,664 | Simpson | Feb. 12, 1889 |
| 1,669,911 | Oster et al. | May 15, 1928 |
| 1,881,111 | Ahern | Oct. 4, 1932 |
| 2,054,028 | Benninghoff | Sept. 8, 1936 |
| 2,054,029 | Benninghoff | Sept. 8, 1936 |
| 2,186,061 | Berg et al. | Jan. 9, 1940 |